350-166 SR
10/12/76 XR 3,986,069

United States Patent [19]

Funahashi

[11] 3,986,069

[45] Oct. 12, 1976

[54] COLOR STRIPE FILTER WITH TWO PROTECTIVE LAYERS

[75] Inventor: Kohei Funahashi, Yokohama, Japan

[73] Assignee: Tokyo Shibaura Electric Co., Ltd., Kawasaki, Japan

[22] Filed: Mar. 19, 1975

[21] Appl. No.: 559,879

[30] Foreign Application Priority Data

Apr. 24, 1974 Japan ................................ 49-45453

[52] U.S. Cl. ................................ 313/371; 313/388; 350/166; 350/317; 427/167

[51] Int. Cl.² ...................... H01J 29/45; G02B 5/28

[58] Field of Search ............. 350/162 SF, 166, 317; 427/165, 166, 167; 313/371, 388; 358/43–46

[56] References Cited

UNITED STATES PATENTS

| | | | |
|---|---|---|---|
| 2,813,989 | 11/1957 | Weimer | 313/371 |
| 3,912,962 | 11/1975 | Nobutoki | 313/371 |
| 3,928,160 | 12/1975 | Nobutoki | 313/371 |

*Primary Examiner*—Ronald J. Stern
*Attorney, Agent, or Firm*—Cushman, Darby & Cushman

[57] ABSTRACT

A spatial filter covered with first protective layers and a second protective layer, wherein the second protective layer is mounted on the first protective layers so as to fill up recesses appearing in the surface of said first protective layers which are evaporated on filter stripes deposited on the surface of a substrate and on those parts of the surface of said substrate on which filter stripes are not formed and, when the spatial filter is placed in an image pickup tube, the second protective layer having a smooth flawless surface enables the image pickup tube to produce a good output image for a long period.

3 Claims, 4 Drawing Figures

FIG. 1
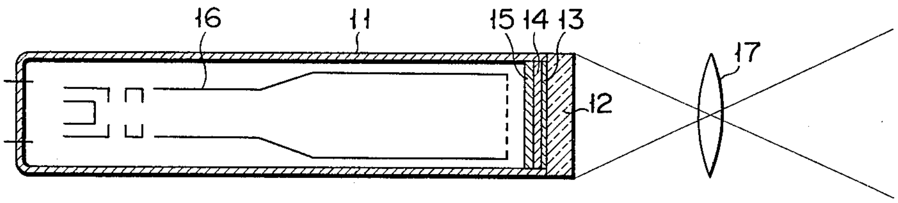
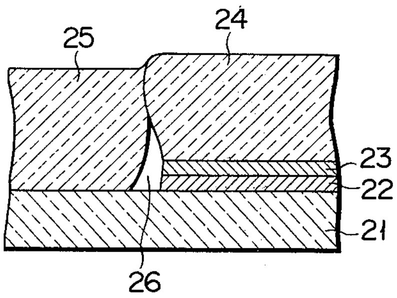
FIG. 2
FIG. 3
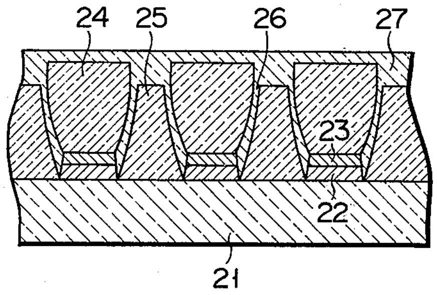
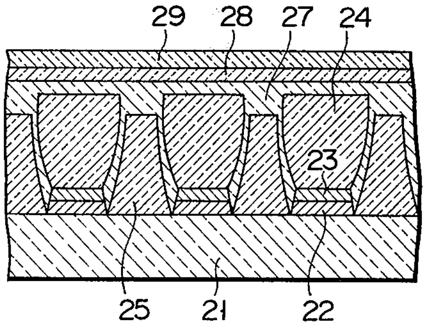
FIG. 4

COLOR STRIPE FILTER WITH TWO PROTECTIVE LAYERS

FIELD OF THE INVENTION

This invention relates to a novel stripe filter or spatial filter, and more particularly to an improved spatial filter coated with two types of protective layer and a method of manufacturing the same.

BACKGROUND OF THE INVENTION

A spatial filter is used with an image pickup tube for converting an input light image into an electric signal or with a photographic system which consists in projecting light only once on a monochrome film and thereafter reproducing from said film an image having the original colors of a foreground subject.

An image pickup tube 11 is generally constructed as illustrated in FIG. 1. An input light image passing through an optical system 17 is further conducted through a spatial filter 13 formed on the inner wall of a faceplate 12 and a transparent conductive layer 14 and then to a photoconductive layer 15, thereby producing a potential image on said photoconductive layer 15. When an image on the photoconductive layer 15 is scanned by electron beams discharged from an electron gun 16 provided at the other end of the image pickup tube, then the potential of said potential image is brought back to the original level and current corresponding to said variations of potential is generated as an electric signal. In recent years, a single- or double-tube type color image pickup device is being developed which is provided with one or two image pickup tubes.

There will now be described a spatial filter used with, for example, a single tube type color image pickup device. A spatial filter is generally prepared by arranging yellow-permeable filter stripes and cyan-permeable filter stripes on a transparent substrate made of, for example, glass at a prescribed interval and in a state intersecting each other at a prescribed angle. Both types of filter stripe are formed by photoetching, namely, evaporating metal such as silver or nickel on a transparent substrate made of, for example, glass, coating photoresist on said evaporated metal layer, projecting light on said coating, followed by development, thereby producing a pattern. The exposed metal layer is partly etched off by an etching solution and the photoresist is removed. As the result, the metal is left on the substrate in the form of stripes to be used as a mask for the subsequent evaporation of filter stripes. A yellow-permeable filter layer is evaporated uniformly on the metal mask as well as on those parts of the substrate surface on which said metal mask is not formed. When, thereafter, said metal mask is etched off, desired yellow-permeable filter stripes are obtained. Cyan-permeable filter stripes intersecting the yellow-permeable filter stripes are formed by repeating the same operation as described above. Those parts of the surface of the substrate which are and are not coated with filter stripes thus formed are uniformly covered first with a transparent conductive layer and then with a photoconductive layer, providing an image pickup tube target. The spatial filter is so disposed in the image pickup tube as to allow the substrate to constitute the faceplate of said image pickup tube.

Where, however, the spatial filter is integrally formed with the image pickup tube target, the transparent conductive layer and photoconductive layer are evaporated with surface irregularities on the filter stripes and on those parts of the surface of the substrate on which the filter stripes are not formed. Such surface irregularities prevent some portions of the transparent conductive layer and photoconductive layer from being deposited on the filter stripes, resulting in the occurrence of defective spots from which any electric signal can not be drawn out. Or while the spatial filter is operated in the image pickup tube, an electric field is concentrated locally on the projecting parts of the surface of a photoconductive layer, namely, those parts covering the filter stripes, eventually leading to the local damage of the image pickup tube target. The prior art spatial filter has further drawbacks that metals, photoresist, etching solutions and washing liquids used in forming filter stripes remain in interstices between said filter stripes and transparent conductor layer, and these residual substances harmfully affect the photoconductive layer and give rise to undesired noises which appear in an output image in the form of white blots.

SUMMARY OF THE INVENTION

It is accordingly an object of this invention to provide a novel spatial filter saved from the aforesaid shortcomings accompanying the prior art spatial filter.

Another object of the invention is to provide a novel spatial filter covered with first protective layers and a second protective layer to eliminate the above-mentioned defects and a method of manufacturing said novel spatial filter.

Still another object of the invention is to provide an image pickup tube containing a novel spatial filter free from said drawbacks.

According to an aspect of the invention, there is provided a spatial filter, wherein those parts of the surface of a transparent substrate on which filter stripes are and are not formed are covered alike with first protective layers, and a second layer is mounted on the first protective layers so as to fill up recesses appearing in the surface thereof.

BRIEF DESCRIPTION OF THE DRAWING

FIG. 1 is a schematic sectional view of an image pickup tube;

FIG. 2 is a sectional view of a spatial filter according to this invention, where gaps and crevice-like faults take place between the filter stripes and first protective layers;

FIG. 3 is a schematic sectional view of the junction of every two intersecting filter stripes of a spatial filter according to this invention provided with first protective layers and a second protective layer; and FIG. 4 is a schematic sectional view of the spatial filter of this invention provided with first protective layers and a second protective layer, where the second protective layer is covered first with a transparent conductive layer and then with a photoconductive layer.

DETAILED DESCRIPTION OF THE INVENTION

With a spatial filter according to this invention, yellow-permeable filter stripes 22 and cyan-permeable filter stripes 23 intersecting said yellow-permeable filter stripes 22 at a prescribed angle are formed on a transparent substrate 21 made of, for example, glass by a known process such as photoetching. Each type of filter stripe is prepared in the form of a laminate by alternately depositing layers of optical material of high and low refractive indices such as titanium oxide, silicon oxide and cerium oxide. Each laminated filter stripe is generally referred to as a multilayer interference membrane. The number of plies constituting said interference membrane and the thickness of said membrane are properly chosen to attain the desired optical properties of a filter stripe thus prepared.

The irregular surface of the transparent substrate 21 resulting from formation of both types of filter stripes 22, 23 is covered with first protective layers 24, 25. These first protective layers 24, 25 consist of such material as does not affect the spectral characteristics of the spatial filter, for example, silicon dioxide or glass and deposited on the filter stripes, for example, by evaporation or sputtering to a thickness of 4 to 10 or preferably 5 to 6 microns. Where said first protective layers 24, 25 are formed of, for example, silicon dioxide free from undesired impurities, then it is desired to deposit said silicon dioxide by evaporation through irradiation of electron beams thereon. Evaporation of silicon dioxide by electron beams prevents the evaporated mass from reacting with a receiving boat, thus providing the first protective layers free from impurities. Since the first layers thus evaporated have substantially the same thickness, they present irregular surfaces as shown in FIg. 2 as a whole, because they are deposited on filter stripes and those parts of the surface of the substrate on which filter stripes are not formed. As experimentally found, the thicker the evaporated first protective layers, the more reduced the height difference between the convex and concave portions of the surface irregularities. However, when made thicker than the aforesaid 10 microns, the first protective layers 24, 25 present difficulties in attaining the desired spectral characteristics as well as in manufacture. The first protective layer 24 evaporated on the filter stripes is grown independently of the first protective layer 25 evaporated on those parts of the surface of the substrate on which filter stripes are not formed. As shown in FIG. 2, therefore, gaps 26 often occur along the boundary of the two first protective layers 24, 25 and, as experimentally formed, crevice-like faults further take place along said boundary. These gaps 26 and crevice-like faults have been shown by experiments associated with this invention to arise when a transparent conductive layer and photoconductive layer are directly evaporated on filter stripes as has been practised in the past. With the prior art spatial filter, metals, photoresist, etching solutions or washing liquids left in the gaps 26 pass through the crevice-like faults and even scatter over the surface of the photoconductive layer, resulting in the generation of the aforesaid undesired noises.

Based on the above discoveries, the spatial filter of this invention is further provided with a second protective layer 27 which is mounted on the first protective layers 24, 25 so as to fill up recesses appearing therein. Prior to formation of the second protective layer 27, it is advised to smooth the surface irregularities of the first protective layers 24, 25 by grinding in order to minimize the dark modulation of dark current, thereby preventing an electric field from being locally concentrated. However, said grinding is difficult to carry out in the ideal form, giving rise to the appearance of fine scars on the surfaces of the first protective layers 24, 25 and the distribution of residues of grinding material all over said surfaces, and consequently rendering the first protective layers 24, 25 thus treated unavailable for practical application. The second protective layer 27 deposited on the first protective layers 24, 25 to avoid the above-mentioned difficulties is also prepared from, for example, silicon dioxide, doped silicon dioxide or glass. A dopant used to this end is selected from the group consisting of boron (B), phosphorus (P), arsenic (As), indium (In), thallium (Tl), gold (Au), gallium (Ga), bismuth (Bi) and germanium (Ge). In this case, the thermal expansion coefficient of silicon dioxide can be adjusted according to the amount of a dopant used, thus preventing the strains and cracks of base layers. The second protective layer 27 will fully serve the purpose if it has a sufficient thickness to fill up recesses in the surface irregularities of the first protective layers 24, 25. Said thickness is generally preferred to be at most 2 microns. Where, however, the surfaces of the first protective layers 24, 25 have already been smoothed by grinding, then the second protective layer 27 is chosen to have a thickness of about 0.2 micron, or preferably 0.2 to 0.5 micron.

The second protective layer 27 is formed, for example, by applying an alcoholic solution containing silicon tetrahydroxide, oxosilanes or organic oxosilanes on the first protective layers 24, 25, using a spinner. In this case, it is desired to apply any of the above-mentioned coating materials several times on the first protective layers 24, 25. One cycle of application at the 3,000 to 10,000 r.p.m. rotation of said spinner provides a second protective layer 27 about 1,000 to about 2,000 A thick. This cycle of application is repeated to provide the second protective layer 27 having a prescribed thickness. When heated to 200° to 900° C in an atmosphere of, for example, oxygen, then the coated membrane provides a film of silicon dioxide ($SiO_2$) or a second protective layer 27 having a smooth surface. Heating temperature is chosen to range between 200° and 600° C to avoid a harmful effect on filter stripes.

In contrast, formation of the second protective layer 27 by evaporation fails to lessen irregularities on the surface of the first protective layers 24, 25, causing said second protective layer 27 also to present an irregular surface like the first protective layers 24, 25. Where formed by a single application of the above-mentioned coating material using the spinner, the first protective layers 24, 25 and the second protective layer 27 only obtain a thickness of about 2000 A and fail to have a smooth surface, leading to the deterioration of the spectral characteristics of the resultant spatial filter. Conversely where coating is repeated too many times in an attempt to provide a desired thickness for the first and second protective layers 24, 25, 27, then the coated material accumulates too thick on the filter stripes, rendering the resultant spatial filter unavailable for practical application due to occurrence of cracks.

With the spatial filter of this invention, the first protective layers 24, 25 are evaporated with surface irregularities on filter stripes and those parts of the substrate on which filter stripes are not formed. The second protective layer 27 is coated on said first protective layers 24, 25 by the spinner so as to plug up recesses appearing in the surface of said first protective layers 24, 25. Therefore, the upper surface of the spatial filter formed at this point, namely, the surface of the second protective layer 27 is made extremely smooth. Though, as previously mentioned, evaporation of the first protective layers 24, 25 unavoidably gives rise to irregularities on the surfaces thereof and the occurrence of crevice-like faults along the boundary of said first protective layers 24, 25, yet application of the second layer 27 on said first protective layers 24, 25 to fill up recesses appearing in the surface thereof using the spinner has enabled the second protective layer 27 to have a very smooth surface and fully plug up the crevice-like faults taking place along the boundary of the first protective layers 24, 25. With the spatial filter of this invention, therefore, even evaporation of a transparent conductive layer 28 and photoconductive layer 29 on the surface of the second protective layer 27 as shown in FIG. 4 has suppressed the local deterioration of, for example, the photoconductive layer 29 and the local concentration of an electric field during operation. Further with the spatial filter of this invention, the second protective layer 27 fully plugs up the crevice-like faults occurring along the boundary of the first protective layers 24, 25 and has prevented, for example, metals, photoresist, etching solutions or washing liquids from spreading over the surface of the photoconductive layer 29, even if these materials happen to be left in the gaps 26 occurring along the boundary of the first protective layers 24, 25, thereby eliminating the generation of objectionable noises which appear in an output image in the form of white blots. The above-mentioned improvements can extend the service life of an image pickup tube containing the spatial filter of this invention in a far greater degree than has been possible with the prior art spatial filter. Further, with the spatial filter of this invention, the first protective layers 24, 25 are evaporated on filter stripes and those parts of the surface of the substrate on which filter stripes are not formed, enabling the spatial filter to display the desired spectral characteristics by controlling the thickness of said first protective layers 24, 25. Said control can be easily carried out.

The second protective layer 27 may also be formed by a different process from that previously described, namely, by applying a mixture of, for example, glass powders, binder and solvent on the first protective layers 24, 25 by the spinner. The glass powders used in this invention are chosen to have a finer particle size than 1 micron and formed by ball milling using, for example, high purity alumina balls and a metal or polyethylene jar. The binder is preferred to be the type easily burnt off at a temperature of 400° to 500° C, such as methylcellulose or nitrocellulose. However, any binder will well serve the purpose, if it can be dissolved in a solvent, allowing the resultant solution to have proper viscosity for application and also enable glass powders to be uniformly dispersed in said solution. For the object of this invention, the solvent is desired to be aluminium acetate or alcohols. The second protective layer 27 coated on the first protective layers 24, 25 is heated to 400° to 500° C to expel the binder, followed by baking at a prescribed temperature. A spatial filter containing a second protective layer 27 thus formed indicates the same effect as that containing a second protective layer 27 prepared from the aforesaid alcoholic solution of silicon tetrahydroxide, oxosilanes or organic oxosilanes. Further, the second protective layer 27 consisting of glass powders can be easily provided, because a single application of any of these coating materials by the spinner can form the second protective layer 27 to a desired thickness.

Application of an alcoholic solution of the previously mentioned silicon tetrahydroxide, oxosilanes or organic oxosilanes or a mixture of glass powders, binder and solvent may be effected by an ordinary process such as immersion, brushing or spraying.

The foregoing description refers to the case where a spatial filter contains a single second protective layer 27. However, said layer may be provided in plurality.

The spatial filter of this invention is finished by mounting first a transparent conductive layer 28 made of, for example, stannic oxide or indium oxide and then a photoconductive layer 29 prepared from, for example, antimony trisulfide on the second protective layer 27 and is so placed in an image pickup tube as to cause the transparent substrate 21 to constitute the faceplate thereof. An image pickup tube containing the spatial filter of this invention presents a good output image and can be used longer than an image pickup tube provided with the prior art spatial filter.

What is claimed is:

1. A spatial filter comprising a transparent substrate; filter stripes projectively formed on said transparent substrate; a first protective layer formed with a thickness of 4 to 10 microns on the substrate and also on the filter stripes projectively provided on said substrate, thereby presenting crevice-like faults along the boundary between the substrate and the filter stripes, as well as along the boundary of filter stripes adjacent each other; and a second protective layer coated 2 microns thick at most on the first protective layer to fill up said crevice-like faults, thereby presenting a smooth surface free from the crevice-like faults.

2. A spatial filter according to claim 1, wherein the first and second protective layers are prepared from a material selected from the group consisting of silicon oxide, doped silicon oxide and glass.

3. An image pickup tube containing the spatial filter of claim 1.

* * * * *